United States Patent [19]
Slingsby et al.

[11] Patent Number: 6,060,525
[45] Date of Patent: *May 9, 2000

[54] REMOVAL OF BORATE IN CHROMATOGRAPHY

[75] Inventors: Rosanne W. Slingsby, Pleasanton; Christopher A. Pohl, Union City; Jacek J. Jagodzinski, Redwood City, all of Calif.

[73] Assignee: Dionix Corporation, Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/609,228

[22] Filed: Mar. 1, 1996

[51] Int. Cl.[7] ................................ B01J 41/14; C08J 5/20
[52] U.S. Cl. .................... 521/28; 210/661; 210/683; 210/684; 521/25; 521/29
[58] Field of Search ........................ 210/684, 683, 210/661; 521/28, 25, 29

[56] References Cited

U.S. PATENT DOCUMENTS

| | | | |
|---|---|---|---|
| 2,813,838 | 11/1957 | Lyman et al. | |
| 4,101,460 | 7/1978 | Small et al. | 521/28 |
| 4,252,644 | 2/1981 | Small et al. | 210/656 |
| 4,351,909 | 9/1982 | Stevens | 521/28 |
| 4,383,047 | 5/1983 | Stevens et al. | 521/28 |
| 4,507,390 | 3/1985 | Horiuchi | 436/161 |
| 4,927,539 | 5/1990 | Stevens et al. | 210/635 |
| 5,066,784 | 11/1991 | Sherrington et al. | 530/334 |
| 5,324,752 | 6/1994 | Barretto et al. | 521/28 |

OTHER PUBLICATIONS

Hicks et al., "Preparation and Purification of Lactulose from Sweet Cheese Whey Ultrafiltrate," *J. Agric. Food Chem.*, 32(2):288–292 (1984).
"Amberlite IRA–743", Rohm & Haas IER, pp. 2–4 (1993).
Hicks et al., "Removal of Boric Acid and Related Compounds from Solutions of Carbohydrates with a Boron–Selective Resin (IRA–743)," *Carbohydrate Research*, 147:39–48 (1986).
Cerrai et al, *Energia Nucleare* (Milan), 5:824 (1958).

*Primary Examiner*—Fred Zitomer
*Attorney, Agent, or Firm*—Flehr Hohbach Test Albritton & Herbert LLP; David J. Brezner

[57] ABSTRACT

A chromatographic composition for the selective binding of borate ion comprising support resin particle and polymers containing covalently bonded borate binding carbohydrates wherein said carbohydrates are a mono-, di- or polysaccharide of three to seven alcohol moieties per saccharide unit.

13 Claims, No Drawings

REMOVAL OF BORATE IN CHROMATOGRAPHY

FIELD OF THE INVENTION

Borate-binding compositions are provided comprising polymers containing covalently attached borate-binding carbohydrates. Methods of making and using the compositions are also provided.

BACKGROUND OF THE INVENTION

Carbohydrates such as glucose and mannose are ionizable to anions at high pH and can therefore be separated on anion exchange chromatography columns in sodium hydroxide eluents.

Known anion-exchange compositions generally fall into several categories. In the more traditional anion-exchange systems, synthetic support resin particles, generally carrying a negative charge, are covered with a layer of smaller synthetic resin particles carrying anion-exchange functional groups of positive charge, i.e. anion-exchange sites. The smaller particles are retained on the larger support particles via electrostatic attraction. The support resin can take a variety of forms. See for example U.S. Pat. Nos. 4,101,460; 4,383,047; 4,252,644; 4,351,909; and 4,101,460.

A more recent development utilizes an uncharged support resin and smaller latex particles containing anion-exchange functional groups, held together by a dispersant. See U.S. Pat. No. 5,324,752.

In addition, methods have been developed to eliminate the smaller latex particles altogether. For example, an anion exchange functionality is grafted, or covalently bonded, to a variety of polymeric substrates; see for example U.S. Pat. No. 5,066,784. Alternatively, the anion-exchange functional groups are not covalently attached but are tightly associated with the support resin particles, either electrostatically or otherwise; see U.S. Pat. No. 4,927,539.

In carbohydrate analysis, analytes with hydroxyl groups with suitable stereochemical configurations, such as sugar alcohols and mannose, show severe chromatographic peak tailing when borate is present in the eluents. This peak tailing, or peak asymmetry, causes the peak to differ from Gaussian distribution with a peak asymmetry value of 1.0. Larger peak asymmetry numbers indicate greater peak tailing. This peak tailing can render the identification and quantification of the carbohydrate analytes difficult.

The borate most commonly enters the eluent system as a contaminant from degrading deionized water systems, or from borate that leaches from glass eluent bottles.

Glucamine (1-amino-1-deoxy-D-glucitol) resin has been used to remove borate from industrial streams. This chemical reaction involves hydrogen bonding through the oxygen atoms of the borate to the diol groups on the resin. For example, Amberlite® IRA-743 (Rohm & Haas Co.) has been used for many years to remove borate from water. The Amberlite® IRA-743 particles are quite large, generally about 1 mm in diameter. This resin is used to bring the borate concentration into the parts per million (ppm) range, which is generally too high for more sophisticated analytical chromatographic methods as peak tailing is not eliminated or sufficiently reduced.

Similarly, a gluconate resin has been used for retaining borate. See Cerrai et al., Energia nucleare (Milan) 5: 824 (1958). These authors used a strong base anion exchange resin in the gluconate form to retain borate, as depicted below in structure 1. In this work, the anion-exchange site itself bears the glucanol group, which is exchangeable for other ions under the right conditions, and thus may not be suitable in some applications.

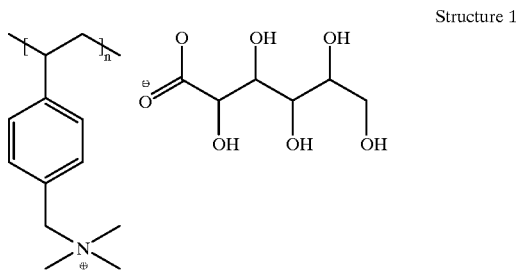

Structure 1

Thus, a need exists for a stable, efficient borate-removing resin for use in chromatography, particularly analytical chromatography.

Accordingly, it is an object of the present invention to provide compositions for use in ion exchange chromatography that can remove borate from the analyte stream prior to detection and thus reduce peak tailing. It is a further object to provide for methods for removing borate from analyte streams.

SUMMARY OF THE INVENTION

In accordance with the objects outlined above, the present invention provides borate-binding compositions comprising Component A comprising support resin particles of less than about 30 microns and polymers containing borate-binding carbohydrates. The borate-binding carbohydrates are retained directly or indirectly on Component A.

Also provided are borate-binding compositions further comprising Component B comprising particles of synthetic resin comprising polymers containing borate-binding carbohydrates on their available surfaces.

Further provided are chromatographic analytical columns containing a packed bed of a borate binding chromatographic packing composition of the present invention.

Also provided are processes for the removal of borate from an analyte stream comprising passing a liquid solution through a bed comprising the borate-binding compositions of the present invention.

Additionally provided are methods of producing a borate binding composition for use in the removal of borate comprising contacting functionalized monomers with activated borate-binding carbohydrates under conditions that allow the attachment of the borate-binding carbohydrate to the monomers. The monomers containing borate-binding carbohydrates are polymerized either before or after the borate-binding carbohydrates are added to form polymers containing borate-binding carbohydrates. The polymers containing borate-binding carbohydrates are incorporated into a borate-binding composition.

DETAILED DESCRIPTION OF THE INVENTION

The present invention provides compositions and methods for the removal of borate in chromatographic applications, to reduce or eliminate peak tailing of analytes containing hydroxyl groups, such as carbohydrates. By covalently attaching functional groups which bind borate, such as sugar alcohols, to chromatographic resin particles, chromatographic columns may be made which selectively bind borate. These columns can then be used either to remove the borate in the analyte stream prior to chromatographic separation to reduce the peak tailing problem, or, alternatively, as borate concentrator columns for the detection and quantitation of borate in samples.

In one embodiment, the invention provides compositions for the selective binding of borate in a sample stream to be chromatographically analyzed comprising Component A, which are support resin particles, and polymers containing covalently attached borate-binding carbohydrates.

By the term "Component A" herein is meant insoluble synthetic support resin particles, such as are known in the art. Component A is traditionally referred to in the art as the "substrate". A wide variety of suitable Component A materials are known in the art, including, but not limited to, poly(phenolformaldehyde), polyacrylic, or polymethacrylic acid or nitrile, amineepichlorohydrin copolymers, graft polymers of styrene on polyethylene or polypropylene, poly(2-chloromethyl-1,3-butadiene), poly(vinylaromatic) resins such as those derived from styrene, alpha-methylstyrene, chlorostyrene, chloromethylstyrene, vinyltoluene, vinylnaphthalene and vinylpyridine, corresponding esters of methacrylic acid, styrene, vinyltoluene, vinylnaphthalene, and similar unsaturated monomers, monovinylidene monomers including the monovinylidine ring-containing nitrogen heterocyclic compounds, and copolymers of the above monomers. The resin particles may also include functionalized monomers such as vinylbenzylchloride. In addition, the resin particles of Component A may be macroporous, such as those produced from suspension polymerization techniques (see U.S. Pat. No. 5,324,752, and references cited therein), and may be formed of any of the materials recited in that patent and such references.

The exact formulation of the support resin particles will depend on the manner in which the polymers containing the borate-binding carbohydrates are attached. When the polymers containing the borate-binding carbohydrates form a coating on the support resin particles or are grafted onto the support resin particles, as is more fully described below, the support resin particles preferably comprise beads of cross-linked polymer or copolymer, such as styrene-ethylvinylbenzene-divinylbenzene copolymer, containing between about 30% to about 100% divinylbenzene monomer by weight. Preferably, the support resin has at least 30%, more preferably about 40%, and most preferably at least about 55% divinylbenzene content.

In this embodiment, preferred support resin particles comprise styrene-ethylvinylbenzene-divinylbenzene copolymer with 55% divinylbenzene. Other preferred support resins include other styrenic co-polymers and terpolymers containing divinylbenzene such as styrene-ethylvinylbenzene-divinylbenzene and vinyltoluene-ethylvinylbenzene-divinylbenzene.

When the polymers containing the borate-binding carbohydrates form the available surface of the Component A support resin particles, the support resin particles are preferably made from copolymers of functionalized monomers and crosslinking monomers. "Functionalized monomers" are known polymerizable monomers containing at least one a functional group that allows attachment of borate-binding carbohydrates. Suitable functionalized monomers will depend on the polymers used to make the compositions of the invention, and include, but are not limited to, the commercially available monomers such as vinylbenzylchloride (VBC), vinylbenzylbromide, vinylbenzyliodide, glycidylacrylate, and glycidylmethacrylate, as well as functionalized monomers not currently commercially available such as vinylbenzyl glycidyl ether, ω-haloalkylacrylates, methacrylates, acrylamides, vinylbenzyl glycidyl ether, or methacrylamides. Preferred functionalized monomers include VBC. "Crosslinking monomers" are known polymerizable monomers (e.g. ethylenically diunsaturated ones) that can interconnect two polymer chains in the resin particles, thus forming crosslinking. Crosslinking monomers are well known in the art, and divinylbenzene is particularly preferred.

In this embodiment, preferred support resin particles comprise vinylbenzylchloride-divinylbenzene copolymer. In this embodiment, from about 3 to about 70% divinylbenzene is preferred, with from about 5 to about 50% being particularly preferred, and from about 10% to about 20% being especially preferred. Correspondingly, from about 20 to about 97% vinylbenzylchloride is preferred, most preferably from about 55 to about 95%, and particularly preferred from about 60 to about 90%.

The size of the Component A support resin particles may vary depending on the other components of the system. Generally, the Component A particles are from about 3 to 105 microns (corresponding to >2500 to about 140 mesh), with from about 5 to about 30 microns being preferred, and from about 8 to about 13 being particularly preferred. It should be understood that particle sizes greater than about 70 microns do not function well in the analytical chromatography applications herein described. Thus, in general, the Component A particles are less than about 70 microns, with less than about 50 being preferred and less than about 30 being particularly preferred. The Component A particles may be monodisperse, and may also be macroporous.

By "borate-binding carbohydrate" herein is meant a mono-, di- or polysaccharide containing from three to seven alcohol (—OH) moieties per saccharide unit. At least two, and preferably three or more of the alcohol moieties of each of the saccharide units are on adjacent carbon atoms of the molecule. In a preferred embodiment, the borate-binding carbohydrate contains at least five adjacent alcohol moieties per each saccharide unit. Without being bound by theory, it appears that two of the oxygen atoms of the borate molecule will associate, most likely via hydrogen bonding, to two adjacent alcohol groups of a saccharide, forming a relatively stable complex.

As is outlined below, the borate-binding carbohydrate must be activated or functionalized for covalent attachment to either functionalized monomers prior to polymerization or to the functionalized monomeric subunits of a polymer. Accordingly, suitable borate-binding carbohydrates are derived from carbohydrates belonging to the groups consisting of tetroses, pentoses, hexoses or heptoses, including, but not limited to, glucose and galactose, and their N-methyl derivatives, and maltose.

The borate-binding carbohydrates are attached to functionalized monomers, as is described below, and incorporated into polymers, and it is the polymers containing the borate-binding carbohydrates which are associated with the synthetic resins as outlined below. Thus, the borate-binding carbohydrates are attached to the monomeric subunits of the polymer just as is known for the attachment of quaternary amines for anion-exchange, for example. In a preferred embodiment, at least about 10% of the monomeric subunits of the polymers have borate-binding carbohydrates attached. In a preferred embodiment, greater than about 50% is preferred, with greater than about 90% being particularly preferred.

Generally, when the polymers containing the borate-binding carbohydrates are directly retained on Component A, for example to form a coating or a graft, the polymers average about 20 monomeric subunits in length, with from about 3 to about 50 being preferred, and from about 10 to about 30 being particularly preferred.

By "retained directly on Component A" or grammatical equivalents herein is meant that the polymers containing the borate-binding carbohydrates are irreversibly retained on the support resin particles. This may be done in three general ways. In one embodiment, polymers containing the borate-binding carbohydrates are grafted, or covalently attached to the support resin particles directly, i.e. without an intervening medium, as is generally described in U.S. Pat. No. 5,066,784. In an alternate embodiment, polymers containing borate-binding carbohydrates can form a coating on the particles of support resin via non-covalent attachment. This attachment, although non-covalent, is considered irreversible. "Irreversible" in this context means that a substantial number of the polymers containing the borate-binding carbohydrates will not be displaced from the available surface of the resin under the normal chromatographic conditions, for example by solutions of strong electrolytes or polyelectrolytes. Nor will shearing forces such as those encountered when a liquid is passed through an anion-exchange column under normal conditions displace the polymers.

In a preferred embodiment, this coating is retained on the available surface of the support resin particles of Component A via electrostatic forces such as is generally described in U.S. Pat. No. 4,927,539, hereby incorporated by reference. As is described more fully below for the interaction of Component A and B, in this embodiment, Component A has charged sites on at least the available surfaces of the particles which attract the polymers containing the borate-binding carbohydrates, and thus the polymers containing the borate-binding carbohydrates are directly retained.

In additional embodiments, this coating is irreversibly attached via other types of forces, such as hydrogen bonding or local hydrophobic interactions.

In a preferred embodiment, the polymers containing the borate-binding carbohydrates are directly retained on Component A and form the major portion (e.g. greater than about 80%, and preferably greater than about 90%) of the available surface of the Component A particles. By "available surface" herein is meant that the surface of the resin which will come into contact either with other resin particles or the sample stream. Thus, for example, the available surface of Component A is that surface which will come into contact with either particles of Component B, when present, or with the sample stream containing the analytes to be separated, for example, the carbohydrates and the borate. When Component A is made from beads of a gel type resin, the available surface are will be essentially the outer surface of those beads, including the surface of the macropores which may be optionally present. Similarly, the available surface of Component B is that surface which will come into contact with either Component A, when present, or the sample stream.

In this embodiment, the polymers containing the borate-binding carbohydrates form the available surface of the Component A particles. That is, the available surface of the support resin particles comprises polymers containing borate-binding carbohydrates. As is described below, this is accomplished by polymerizing the support resin particles from of a mixture of crosslinking monomers and functionalized monomers. The borate-binding carbohydrates are attached to the functionalized monomeric subunits, either before or after polymerization, resulting in support resin particles that have borate-binding carbohydrates on their available surfaces.

By "indirectly retained on Component A" or grammatical equivalents herein is meant that the polymers containing the borate-binding carbohydrates are separated from Component A by a second, intervening medium, and may be attached to the medium, which in turn is retained directly on Component A, as is known in the art. See for example, U.S. Pat. Nos. 4,101,460; 4,383,047; 4,252,644; 4,351,909; 4,101,460; and 5,324,752, hereby incorporated by reference.

Thus, in a preferred embodiment, the borate-binding compositions of the invention further comprise Component B, which are particles of synthetic resin having borate-binding carbohydrates on their available surfaces. Component B, frequently referred to in the art as the "latex", "layering particles", or "monolayer", comprises cross-linked polymers that have functionalized monomers, as defined above, as a component. The Component B particles may be formed of any well known synthetic resin such as is described above for Component A particles, with cross-linked polymers of poly(vinylaromatic) resins, such as the copolymers styrene-divinylbenzene copolymer, divinylbenzene-vinylbenzylchloride copolymer, or methacrylate-vinylbenzylchloride copolymer. The Component B particles are usually derived from a latex emulsion. Component B materials and methods are well known in the art, see for example, U.S. Pat. Nos. 4,101,460; 4,383,047; 4,252,644; 4,351,909; 4,101,460; and 5,324,752, hereby incorporated by reference.

The size ratio of Component A to Component B can vary, and is generally well known in the art. As noted above, the Component A particles usually range from about 3 to about 50 microns, with the Component B particles ranging from about 20 to about 600 nanometer, with from about 100 to about 500 being preferred, and from about 300 to about 450 being particularly preferred.

The Component B resin will contain some fraction of functionalized monomeric units in order to attach the borate-binding carbohydrates. Generally, the Component B resin will have at least about 50% functionalized monomer, more preferably at least about 75% functionalized monomer, and most preferably at least about 85 to about 95% functionalized monomer, with about 99% being particularly preferred. In a preferred embodiment, the Component B resin contains from about 1 to about 50% crosslinking monomer, such as divinylbenzene, with from about 1 to about 10% being preferred and from about 1 to about 5% being preferred. In an additional embodiment, the Component B resin may be copolymerized with hydrophobic monomers such as styrene or hydrophilic monomers such as vinylbenzylalcohol.

The polymers containing the functionalized monomers form the resin particles, which are then reacted with the activated borate-binding carbohydrates to form polymers containing borate-binding carbohydrates. Alternatively, as outlined below, the borate-binding carbohydrates are added to the functionalized monomers prior to polymerization into the Component B resin particles.

This results in Component B resin particles that comprise polymers containing or including borate-binding carbohydrates, at least on their available surfaces. Generally, as outlined above, at least about 50% of the monomeric subunits of Component B resin particles contain borate-binding carbohydrates, with at least about 90% being preferred.

In a preferred embodiment, the Component B resin particles are retained on the Component A particles by electrostatic forces. In this embodiment, the Component A support resin particles have negatively charged sites on at least their available surfaces, as is known in the art, via sulfonation, for example. The Component B particles are electrostatically bound in one of two ways. In a preferred embodiment, the amino group of an amino-modified borate-binding carbohydrate is quaternized after attachment to the Component B polymers, thus acquiring a positive charge. Thus, the Component B particles are positively charged and are thus attracted to the negatively charged Component A particles.

Alternatively, the Component B particles may be agglomerated onto the negatively charged Component A particles prior to the addition of the borate-binding carbohydrate. In this embodiment, as outlined below, the Component B particles are made via a dimethylsulfonium positively charged ion. Prior to the addition of the activated borate-binding carbohydrate, the Component A and B particles are agglomerated, and then the borate-binding carbohydrate is attached. Thus the two Components are held together via the electrostatic interaction. This interaction is considered irreversible under normal chromatographic conditions.

In another embodiment, the Component B resin particles are retained on the Component A particles via the use of a dispersant, such as described in U.S. Pat. No. 5,324,752, hereby incorporated by reference. In this embodiment, the Component A particles need not have charged sites on their available surfaces. Rather, the Component A particles are formed by suspension polymerization in the presence of a suitable dispersant, causing the formation of support resin particles having dispersant irreversibly attached. The support resin particle-dispersant complex is then contacted with the Component B particles comprising polymers containing borate-binding carbohydrates. Under suitable reaction conditions, the Component B particles become irreversibly attached, to form a Component A particle-dispersant-Component B particle complex.

The borate-binding compositions of the present invention reduce or prevent the peak tailing as compared to carbohydrate chromatography in the presence of borate. Thus, the current compositions allow the peak asymmetry values to be less than about 2.0, with less than about 1.7 being preferred, and less than about 1.5 being particularly preferred.

The borate-binding compositions of the invention may be made as follows.

Component A support resin particles are made as is known in the art, using general polymerization techniques. See U.S. Pat. Nos. 4,101,460; 4,383,047; 4,252,644; 4,351,909; 4,101,460 and 5,324,752, hereby incorporated by reference.

The monomers containing borate-binding carbohydrates are made from functionalized monomers and activated borate-binding carbohydrates. By "activated borate-binding carbohydrates" or grammatical equivalents herein is meant a borate-binding carbohydrate that contains a functional group that allows attachment of the borate-binding carbohydrate to a functionalized monomer. Preferred activation groups include, but are not limited to, amino groups, thiol groups, and halogens. When the functionalized monomer is VBC for example, preferred activated borate-binding carbohydrates are amino-modified borate-binding carbohydrates, i.e. borate-binding carbohydrates that contain an amino group. The amino group can be primary, secondary, or tertiary, with primary and secondary amines being preferred. As outlined below, the amino modified borate-binding carbohydrate may be later altered to be quaternary.

Preferred activated borate-binding carbohydrates include, but are not limited to, glucosamine, galactosamine, or their N-methyl derivatives.

Activated borate-binding carbohydrates are covalently attached to the functionalized monomers using general techniques. In the case of amino-modified borate-binding carbohydrates, a preferred embodiment utilizes dimethyl sulfide to convert the VBC unit to its dimethylsulfonium derivative as shown in Reaction 1:

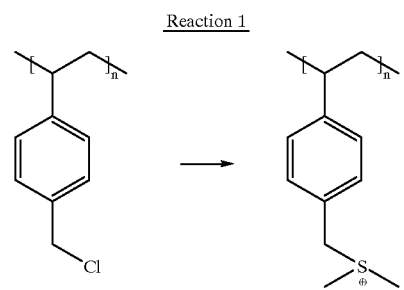

Reaction 1

The dimethylsulfonium derivative is then contacted with the amino-modified borate-binding carbohydrate to form the polymers with covalently attached borate-binding carbohydrates, as shown in Reaction 2:

Reaction 2

Direct retention of polymers containing the borate-binding carbohydrates on Component A may be accomplished in several ways. In one embodiment, polymers containing functionalized monomers are grafted onto the Component A particles as previously described in the literature. Once attached to the Component A particles, the functionalized monomers may be reacted with the borate-binding carbohydrates. Alternatively, the borate-binding carbohydrates may be added to the functionalized monomers prior to polymerization. After polymerization, the polymers containing the borate-binding carbohydrates are grafted to the Component A particles using known chemistries.

When the polymers containing the borate-binding carbohydrates are not covalently attached but rather form a coating on the Component A particles, the borate-binding composition is made via the addition of polymers containing the borate-binding carbohydrates. That is, functionalized monomers are polymerized and then the polymer is reacted with the borate-binding carbohydrates. The polymer is then associated with the Component A particles either electrostatically or otherwise.

A preferred embodiment utilizes polymers containing the borate-binding carbohydrates that form the available surface of the Component A particles. In this embodiment, the Component A support resin particles are made by copolymerization of functionalized monomers and a crosslinking monomer such as DVB. Generally, the support resin particles are made with functionalized monomers which are then used to attach activated borate-binding carbohydrates, although it is also possible to attach the borate-binding carbohydrates to the functionalized monomers prior to polymerization as described herein.

Adding the anion-exchange functional groups to the Component B particles is accomplished in a similar manner, and can done in several ways. In one embodiment, a batch of latex is synthesized in the conventional manner using a functionalized monomer as a component, see U.S. Pat. Nos. 4,101,460; 4,383,047; 4,252,644; 4,351,909; 4,101,460 and 5,324,752, hereby incorporated by reference, as is described above for Component A particles. The latex can then be combined with the borate-binding carbohydrate to form Component B particles comprising polymers containing the borate-binding carbohydrates. The Component B particles are then agglomerated onto the Component A particles.

Alternatively, functionalized monomers can be reacted with the borate-binding carbohydrates and then mixed with other suitable monomers and polymerized into polymers containing the borate-binding carbohydrates.

Furthermore, Component B particles comprising the polymers containing the functionalized monomers may be reacted with dimethyl sulfide, for example, to form a positively charged sulfonium ion. The negatively charged Component A and B particles can then be agglomerated, and then the sulfonium ion can be used to attach the borate-binding carbohydrate.

Alternatively, the amino-modified borate-binding carbohydrate can be modified to be a quaternary amine, carrying a positive charge, using techniques well known in the art. Thus results in the Component B particles carrying a positive charge, and then they may be agglomerated onto the Component A particles.

Once made, the borate binding compositions may be packed into chromatographic columns as is known in the art. The compositions of the present invention find use in analytical scale chromatography, and thus the columns are much smaller than industrial type columns. Accordingly, suitable columns are generally from about 1 mm to about 10 mm in diameter, with about 2 to about 4 mm being preferred, and from about 3 mm to about 100 mm in length, with about 5 mm to about 100 mm being preferred.

Once made, the borate-binding compositions of the invention find use in a number of applications.

In one embodiment, the compositions of the invention are used to selectively bind borate from a sample stream to be chromatographically analyzed. Generally, the sample stream is a liquid solution containing analytes with hydroxyl groups, such as carbohydrates, including carbohydrates, alditols and amino acids to be separated. The borate-binding composition is packed into a column and used prior to the chromatographic separator column and detector. Detection is done as is known in the art.

In a preferred embodiment, the borate-binding compositions of the invention allow sufficient removal of borate from the sample stream to reduce either the. concentration of borate in the stream or peak tailing of the analyte. Thus, for example, the compositions allow the removal of borate from sample streams to be chromatographically analyzed to concentrations below about 5 parts per billion (ppb), with below about 3 ppb being preferred and below about 1 being particularly preferred. Alternatively, the compositions allow the removal of borate from the sample streams to reduce peak tailing due to the presence of borate. Thus, peak asymmetry values of less than about 2 are preferred, with values less than about 1.7 being particularly preferred and less than about 1.5 being especially preferred.

In an additional embodiment, the borate-binding compositions of the invention are used to make borate concentrator columns for the detection and/or quantification of borate in a sample stream. In this embodiment, a liquid solution containing the borate is passed through a borate concentrator column in which the borate is retained. At some later time a developing reagent is passed through the concentrator column to remove the borate in a concentrated borate eluent which can then be detected or quantified as needed. The developing reagent can be similar to the regeneration reagent, and may be acid or reduced carbohydrate.

The following examples serve to more fully describe the manner of using the above-described invention, as well as to set forth the best modes contemplated for carrying out various aspects of the invention. It is understood that these examples in no way serve to limit the true scope of this invention, but rather are presented for illustrative purposes. All references cited herein are incorporated by reference.

EXAMPLES

Example 1

N-methylglucamine functionalized resin was prepared by mixing 36.5 g of 14 micron resin (15% divinylbenzene/70% vinylbenzylchloride) with 25.3 g dimethyl sulfide and 210 g methanol. This mixture was shaken at 50 deg C. for 14 hours, cooled, filtered and cleaned by washing repeatedly with methanol and water. This preparation yielded 107 g raw resin. The raw resin was mixed with 67 g N-methylglucamine and 250 mL water. This suspension was refluxed for 12 hours, cooled, filtered and cleaned repeatedly with methanol and water. This resin was finally washed with 0.2 M NaOH and air dried. The final yield was 69 g.

Example 2

A 3×200 mm column was packed with Amberlite® IRA-743. An eluent of 200 mM NaOH was pumped over the resin bed for 20 min. at 2 mls/min.

Meanwhile, 8 ppm sorbitol was injected into a carbohydrate analysis system that consisted of a CarboPac PA10 prototype column, 0.018 M NaOH eluent and a pulsed amperometric detector. The sorbitol peak eluted at 1.93 min. with a peak asymmetry of 4.33. The IRA-743 column was placed between the pump and injection valve. After 30 minutes the 8 ppm sorbitol standard was reinjected and the peak asymmetry was decreased to 2.25. About 45 minutes later the sorbitol was again injected and the peak asymmetry was 4.1. This device did not perform to an acceptable level either in terms of lowering the asymmetry to less than 1.5 or in terms of lifetime, although the concept of using this type of resin to remove borate from eluents was generally proven feasible.

Example 3

The resin from Example 1, hereafter referred to BT resin, was packed into a 4×50 mm column. The chromatography system was composed of a CarboPac PA10 column, an 0.018 M sodium hydroxide eluent that was spiked with 10 ppb borate (as $BO_3$) and a pulsed amperometric detector. When the BT column is used it is placed between the pump and the injection valve. A 100 pmol standard of dulcitol was injected without the BT column in the system the peak asymmetry was 3.5. After the BT column was placed in the system for 10 minutes, another injection was made and the peak asymmetry was 1.10. This represents a 218% improvement is peak asymmetry. This column has the capacity to treat 250 L of this eluent for 250,000 minutes at 1 mL/min.

Example 4

The column and system from Example 3 was used for the analysis of mannose. The borate-spiked eluent in this case was composed of 0.018 M sodium hydroxide and 10 ppm borate (as $BO_3$). The asymmetry for mannose decreased from 1.52 to 1.11 in 20 minutes when the BT column was placed in the system. This represents a 37% improvement in peak shape.

We claim:

1. A composition for the selective binding of borate from a sample stream to be chromatographically analyzed comprising:
    a) Component A comprising support resin particles; and
    b) polymers containing covalently attached borate-binding carbohydrates; wherein said borate-binding carbohydrate is a mono-, di-, or polysaccharide containing from three to seven alcohol moieties per saccharide unit, wherein said polymers are retained directly or indirectly on Component A, wherein said resin particles are less than about 30 microns in diameter and wherein treatment of said sample stream by said composition under alkaline pH conditions results in peak asymmetry values of less than about 2.0 on a subsequent chromatographic separator column under said alkaline pH conditions.

2. A composition according to claim 1 wherein said borate-binding carbohydrates are selected from the group consisting of tetroses, pentoses, hexoses or heptoses.

3. A composition according to claim 1 wherein said polymers containing covalently attached borate-binding carbohydrate from a coating on Component A.

4. A composition according to claim 1 wherein said polymers containing covalently attached borate-binding carbohydrates are covalently attached directly to Component A, forming the major portion of the available surface of said resin particles.

5. A composition according to claim 1 wherein said polymers containing borate-binding carbohydrate comprises Component B resin particles.

6. A composition according to claim 5 wherein said Component A particles and said Component B particles are held together by electrostatic forces.

7. A composition according to claim 5 wherein said Component A and B particles are held together by a dispersant.

8. A chromatographic column, the column containing a packed bed of a composition for the selective binding of borate in a sample stream to be chromatographically analyzed comprising:
    a) Component A comprising support resin particles; and
    b) polymers containing covalently attached borate-binding carbohydrates; wherein said borate-binding carbohydrate is a mono-, di-, or polysaccharide containing from three to seven alcohol moieties per saccharide unit, wherein said polymers are retained directly or indirectly on Component A, wherein said resin particles are less than about 30 microns in diameter and wherein treatment of said sample stream under alkaline pH conditions results in peak asymmetry values of less than about 2.0 on a subsequent chromatographic separator column under said alkaline pH condition.

9. A chromatographic column according to claim 8 wherein said column is no greater than 10 mm in diameter and no greater than 250 mm in length.

10. A composition for the selective binding of borate from a sample stream to be chromatographically analyzed comprising:
    a) Component A comprising support resin particles; and
    b) polymers containing covalently attached borate-binding carbohydrates; wherein said borate-binding carbohydrate is a mono-, di-, or polysaccharide containing from three to seven alcohol moieties per saccharide unit, wherein said polymers are retained directly or indirectly on Component A, wherein said resin particles are less than about 30 microns in diameter and wherein treatment of said sample stream by said composition under alkaline pH conditions results in a concentration of borate in said treated sample stream of less than about 5 parts per billion (ppb).

11. A chromatographic system, comprising:
    a) a sample treatment column for the selective binding of borate in a sample stream to be chromatographically analyzed containing an inlet an outlet, and a packed bed of a composition comprising
        i) Component A comprising support resin particles; and
        ii) polymers containing covalently attached borate-binding carbohydrates;
    wherein said borate-binding carbohydrate is a mono-, di-, or polysaccharide containing from three to seven alcohol moieites per saccharide unit, wherein said polymers are retained directly or indirectly on Component A, wherein said resin particles are less than about 30 microns in diameter; and
    b) a chromatographic separator column comprising an inlet and an outlet, where the outlet of said sample treatment column is in fluid communication with the inlet of said chromatographic separator column.

12. A system according to claim 11, wherein said sample treatment column results in a concentration of borate in said sample stream of less than about 5 parts per billion (ppb).

13. A system according to claim 11, wherein said sample treatment column results in peak asymmetry values of less than about 2.0 on the chromatographic separator column under alkaline pH conditions.

* * * * *

UNITED STATES PATENT AND TRADEMARK OFFICE
CERTIFICATE OF CORRECTION

PATENT NO. : 6,060,525
DATED : May 9, 2000
INVENTOR(S) : Rosanne W. Slingsby et al.

It is certified that error appears in the above-identified patent and that said Letters Patent is hereby corrected as shown below:

<u>Title page,</u>
Item [73], Assignee, change the spelling of "Dionix Corporation" to
-- Dionex Corporation --.

Signed and Sealed this

Twelfth Day of August, 2003

JAMES E. ROGAN
*Director of the United States Patent and Trademark Office*